United States Patent
Minton et al.

[11] Patent Number: 5,927,330
[45] Date of Patent: Jul. 27, 1999

[54] MODULAR, HIGH-VOLUME, ROTARY SELECTOR VALVE

[75] Inventors: Randy Minton, Saginaw; Roger Hart; Richard Castillo, both of Arlington, all of Tex.

[73] Assignee: Oil States Industries, Arlington, Tex.

[21] Appl. No.: 08/596,077

[22] Filed: Feb. 6, 1996

[51] Int. Cl.[6] .................................................. F16K 11/085
[52] U.S. Cl. ............................... 137/625.11; 137/625.47; 251/367
[58] Field of Search .......................... 137/625.11, 625.47, 137/605, 599; 251/367

[56] References Cited

U.S. PATENT DOCUMENTS

| | | | |
|---|---|---|---|
| 2,278,246 | 3/1942 | Cordova | 137/625.11 |
| 2,523,521 | 9/1950 | Ritter | 137/625.11 X |
| 2,806,486 | 9/1957 | McDonald et al. | 137/625.11 X |
| 2,821,998 | 2/1958 | Mayhew | 137/625.11 |
| 2,835,273 | 5/1958 | McDonald | 137/625.11 |
| 2,979,451 | 4/1961 | Pettingen | 137/625.11 X |
| 2,996,083 | 8/1961 | Huska | 137/625.11 |
| 3,034,528 | 5/1962 | Wharff, Jr. | 137/625.11 X |
| 3,165,122 | 1/1965 | Sachnik | 137/625.47 |
| 3,174,509 | 3/1965 | Wadey | 137/625.11 |
| 3,194,267 | 7/1965 | Lyon et al. | 137/625.11 |
| 3,741,248 | 6/1973 | Stevens et al. | 137/627 |
| 3,872,889 | 3/1975 | Smith et al. | 137/625.21 |
| 4,410,001 | 10/1983 | Goguen | 137/217 |
| 4,410,003 | 10/1983 | Sandling | 137/312 |
| 4,989,641 | 2/1991 | Jones et al. | 137/625.11 |
| 5,046,522 | 9/1991 | LeDevehat et al. | 137/385 |
| 5,052,430 | 10/1991 | Trautwein | 137/315 |
| 5,307,838 | 5/1994 | d'Agostino et al. | 137/625.11 |
| 5,329,959 | 7/1994 | Owen et al. | 137/315 |
| 5,348,271 | 9/1994 | Owen et al. | 251/95 |
| 5,385,167 | 1/1995 | Owen et al. | 137/315 |
| 5,413,143 | 5/1995 | d'Agostino et al. | 137/625.11 |

OTHER PUBLICATIONS

Continental–Emsco Co., Catalog 1968–69; Published in: 1 Composite Catalog of Oil Field Equipment and Services, pp. 1303–1304 (28th Rev. 1968).

Continental–Emsco Co., Catalog 1982–83; Published in: 2 Composite Catalog of Oil Field Equipment and Services, p. 2136 (35th Rev. 1982).

Continental–Emsco Co., Catalog 1974–75; Published in: 1 Composite Catalog of Oil Field Equipment and Services, p. 1270 (31st Rev. 1974).

LTV Energy Products Co., 1988–89 General Catalog; Published in: 2 Composite Catalog of Oil Field Equipment and Services, p. 2277 (38th Rev. 1988).

Continental–Emsco Co., Rotary Selector Valve and Activator Brochure, 1994.

National Certified Fabricators, Inc., Rotary Selector Valve Brochure, 1991.

Erichsen Co., Multiport Selector Valve Brochure, 1994.

Erichsen Co., Multiport Selector Valve Technical Brochure, 1989.

Shell Corp., Production Newsletter, 1995.

Russian Publication, Ministry of Petroleum Industry of the USSR, User's Manual for Multi–Way Well Switch PSM 4–40–8, 1985 with English translation.

*Primary Examiner*—John Rivell
*Attorney, Agent, or Firm*—Arnold White & Durkee

[57] ABSTRACT

A high volume rotary selector valve having a modular structure is disclosed. The disclosed device operates to select one of a plurality of individual source lines of pressurized oil, gas, or other matter to divert the contents of the selected line to a predetermined destination for metering, testing, or sampling without interrupting the flow from other source lines. The modular design permits a large number of input lines to be attached to the valve without a corresponding increase in the valve's diameter or material thickness. Additionally, the modular design affords the user the ability to upgrade an existing selector valve system to increase the number of inlet ports, change the size of the inlet or outlet ports, or change the inlet or outlet port connector types.

6 Claims, 7 Drawing Sheets

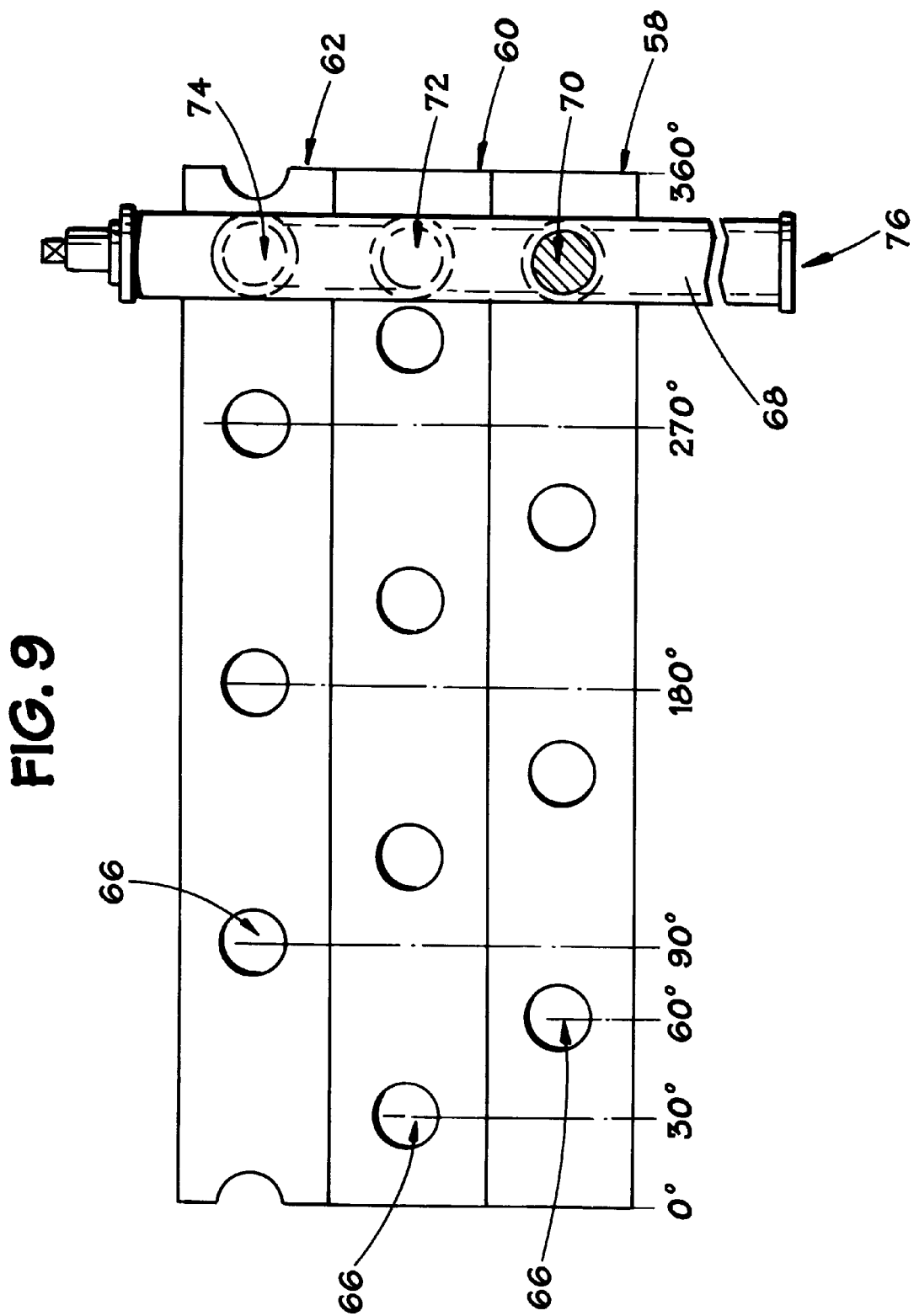

MODULAR, HIGH-VOLUME, ROTARY SELECTOR VALVE

BACKGROUND OF THE INVENTION

1. Field of the Invention

The present invention relates generally to valves and, more particularly, to a modular rotary selector valve for selecting amongst a plurality of individual source lines to divert the contents of a selected source line to a selected destination.

2. Description of the Related Art

Although multiple port selector valves have, in the past, been used in a variety of applications, a predominant use of such valves has been in the area of oil and natural gas production. Broadly speaking, oil and gas development entails the drilling of wells, bringing underground well fluids to the surface (i.e., production), and preparing the obtained oil-gas mixture for refining. Because many oil fields contain a number of producing wells at any given time and such wells may be spaced a great distance apart, it is generally most efficient to transport the production from each of the individual wells to a central gathering station so that the well fluids can be combined and then transferred to subsequent stages in the production process where the oil and gas will be separated prior to refining.

To properly manage the production portion of this process it is important to acquire accurate and immediate test data from each of the individual producing wells in the field. The progress of the water front, steam front or pressure front, and the maintenance of proper injection conditions are all carefully controlled and timed. To accomplish this, each well is tested individually by taking a test flow from each well's production line. This, of course, is done before the well fluids and gases from all of the wells are intermingled.

Since each of the wells' fluids and gases remain separate up to the central gathering station where they are all combined, rotary selector valves have been employed at the central gathering station whereby the required test flow is taken at this stage of the production process, rather than from each well individually. Such rotary selector valves selectively choose a single well production line from the plurality of well production lines for downstream testing. This saves on the amount of pipe necessary to implement the testing of individual wells and simplifies the overall testing process.

Existing rotary selector valves have a singular molded valve body with up to eight inlet ports for receiving the production from up to eight individual wells. The interior of the valve body is enclosed by a cover plate that mounts to the top of the valve body. Within the interior of the valve body is a rotor assembly that is rotatably mounted between the cover plate and the bottom of the valve body. The rotor assembly contains a single inlet opening and can be rotated so that the inlet opening isolates a single selected inlet port on the valve body to receive the well fluids from the production line coupled to the selected inlet port. The well fluids from the isolated inlet port are then directed through the rotor assembly to a test outlet at the bottom of the valve body. The well fluids received from the non-isolated inlet ports are combined within the interior of the valve body and exhausted through a production outlet, also at the bottom of the valve body.

Although such existing rotary selector valves operate in generally satisfactory fashion to select individual production lines for testing, such systems have inherent practical limitations. One such limitation is the size and total number of well production lines that can reasonably be accommodated using a single rotary selector valve. In order to provide for a greater number of inlet ports on the existing rotary selector valve design, the inside diameter of the valve body would have to be expanded as the size and number of inlet ports is increased. In addition, the valve body and pressure containing components of the rotary selector valve would have to be made of thicker or higher strength material to allow for increased operating loads encountered as a result of the larger physical size. These considerations would necessarily add to the bulk, weight, and cost of the rotary selector valve. Moreover, it would become physically and economically impractical to make a one-piece valve casting to accommodate a greater size or number of inlet ports.

Another limitation of the prior art valve design is that it does not offer the flexibility of being upgradable. If the user wishes to increase the number of inlet ports, change the size of the inlet or outlet ports, or change the inlet or outlet port connector types, the user would have to purchase an entirely new rotary selector valve. This is economically disadvantageous.

The present invention is directed at overcoming, or at least minimizing, one or more of the problems set forth above.

SUMMARY OF THE INVENTION

In accordance with one aspect of the present invention, there is provided a modular rotary selector valve. The modular rotary selector valve includes an outlet port module having a first and second outlet ports. An upper valve body module having a plurality of radially spaced inlet ports is coupled to a lower valve body module having a plurality of radially spaced inlet ports. The lower valve body module is coupled to the outlet port module. A valve body head is coupled to the upper valve body to enclose the interior portion of the valve body. Rotatably mounted between the outlet port module and the valve body head is an inlet port selector rotor having first and second inlet openings and an outlet opening. The first and second inlet openings of the inlet port selector rotor are disposed adjacent the plurality of radially spaced inlet ports of the lower and upper valve body modules, respectively. The outlet opening of the inlet port selector rotor is operatively coupled in communication with the first outlet port of the outlet port module.

In accordance with another aspect of the present invention, there is provided a modular rotary selector valve. The modular rotary selector valve includes an outlet port module having an outlet port. A second valve body module having a plurality of radially spaced inlet ports is coupled to a first valve body module having a plurality of radially spaced inlet ports. The first valve body module is coupled to the outlet port module. A valve body head is coupled to the second valve body module to enclose the interior portion of the valve body. Rotatably mounted between the outlet port module and the valve body head is an inlet port selector rotor for selectively coupling one of the plurality of inlet ports to the outlet port.

In accordance with a further aspect of the present invention, there is provided an apparatus for selectively coupling one of a plurality of input lines to an output line. The apparatus includes an outlet port module having an outlet port. A second valve body module having a plurality of inlet ports is coupled to a first valve body module having a plurality of inlet ports. The first valve body module is coupled to the outlet port module. Movably mounted to the outlet port module is an inlet port selector device for selectively coupling one of the plurality of inlet ports to the outlet port.

BRIEF DESCRIPTION OF THE DRAWINGS

Advantages of the invention will become apparent upon reading the following detailed description and upon reference to the drawings in which:

FIG. 9 is a schematic representation of the inlet port and rotor configuration of the third alternative embodiment illustrated in FIG. 7.

Figure 1:
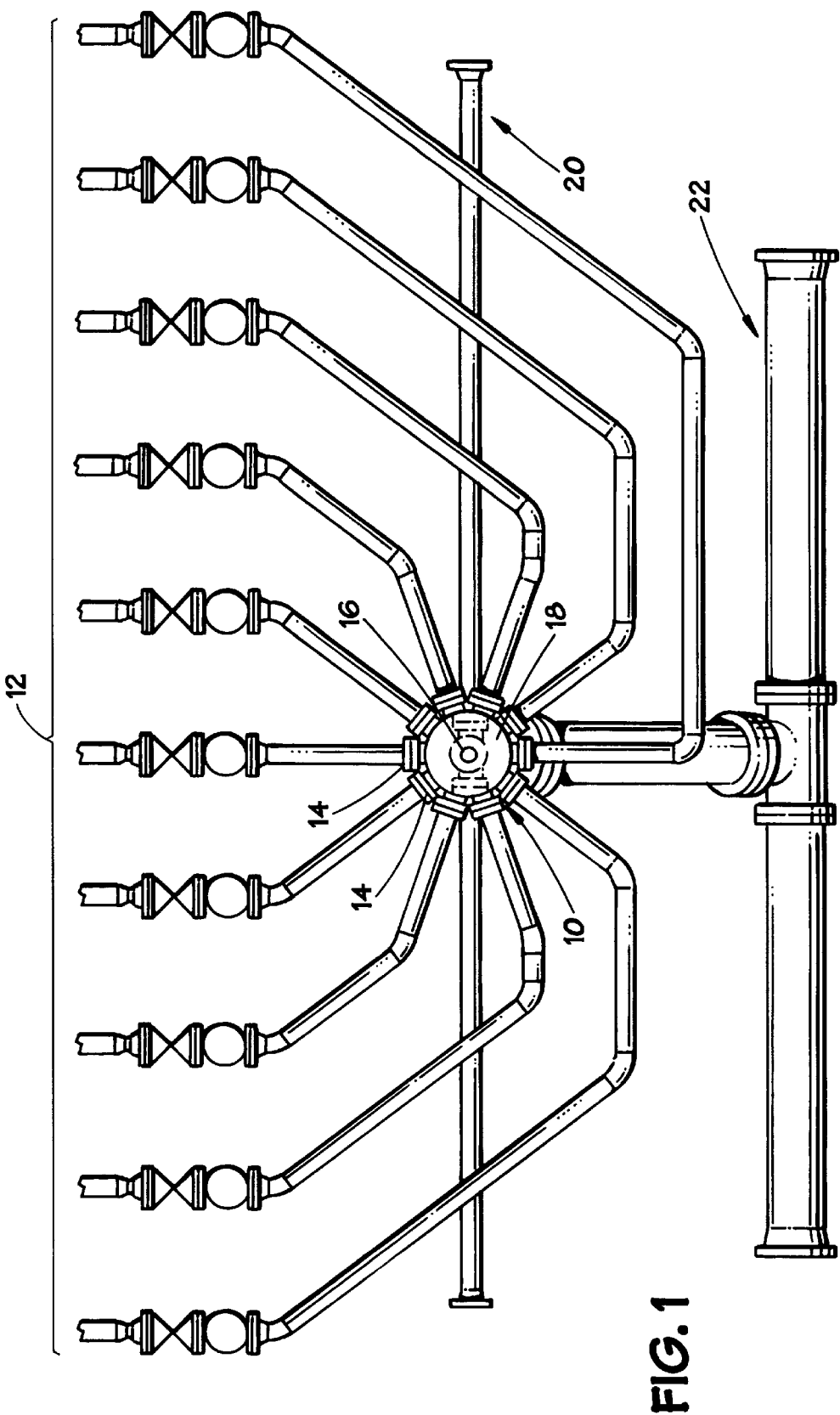
FIG. 1 illustrates a modular rotary selector valve system configuration.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE SPECIFIC EMBODIMENTS

The several embodiments of rotary selector valves described herein employ a modular construction that facilitates (1) the use of a greater number of inlet ports than known rotary selector valves, (2) the use of larger inlet ports than known rotary selector valves, and (3) the customization and reconfiguration of a rotary selector valve for a given application.

Turning now to the drawings, a typical modular rotary selector valve 10 system configuration is illustrated in FIG. 1, which shows a modular rotary selector valve 10 as used, for example, in an oil and gas application. The system configuration of FIG. 1 is for illustrative purposes only and is not intended to limit the applications in which the present invention may be utilized, as it will be recognized that the described advantages set forth herein are applicable to other uses of the modular rotary selector valve 10.

Each of the incoming production lines 12 from the individual producing wells in an oil field are connected at the respective inlet ports 14 of the modular rotary selector valve 10. The inlet ports 14 allow the induction of oil and gas ("production") from the incoming production lines 12 into the interior portion of the valve body 18. The inlet port selector rotor 16 is rotatable to select a single inlet port 14 to isolate the production from one of the incoming production lines 12. The production from the selected incoming production line 12 is diverted, via the inlet port selector rotor 16, to the test line 20. The production from each of the remaining non-selected incoming production lines 12 is combined within the interior portion of the valve body 18 and delivered to the combined production line 22. In this manner, the production from the selected incoming production line 12 can be individually sampled and tested from the test line 20 without interrupting the production flows from the remaining non-selected incoming production lines 12.

Figure 2:
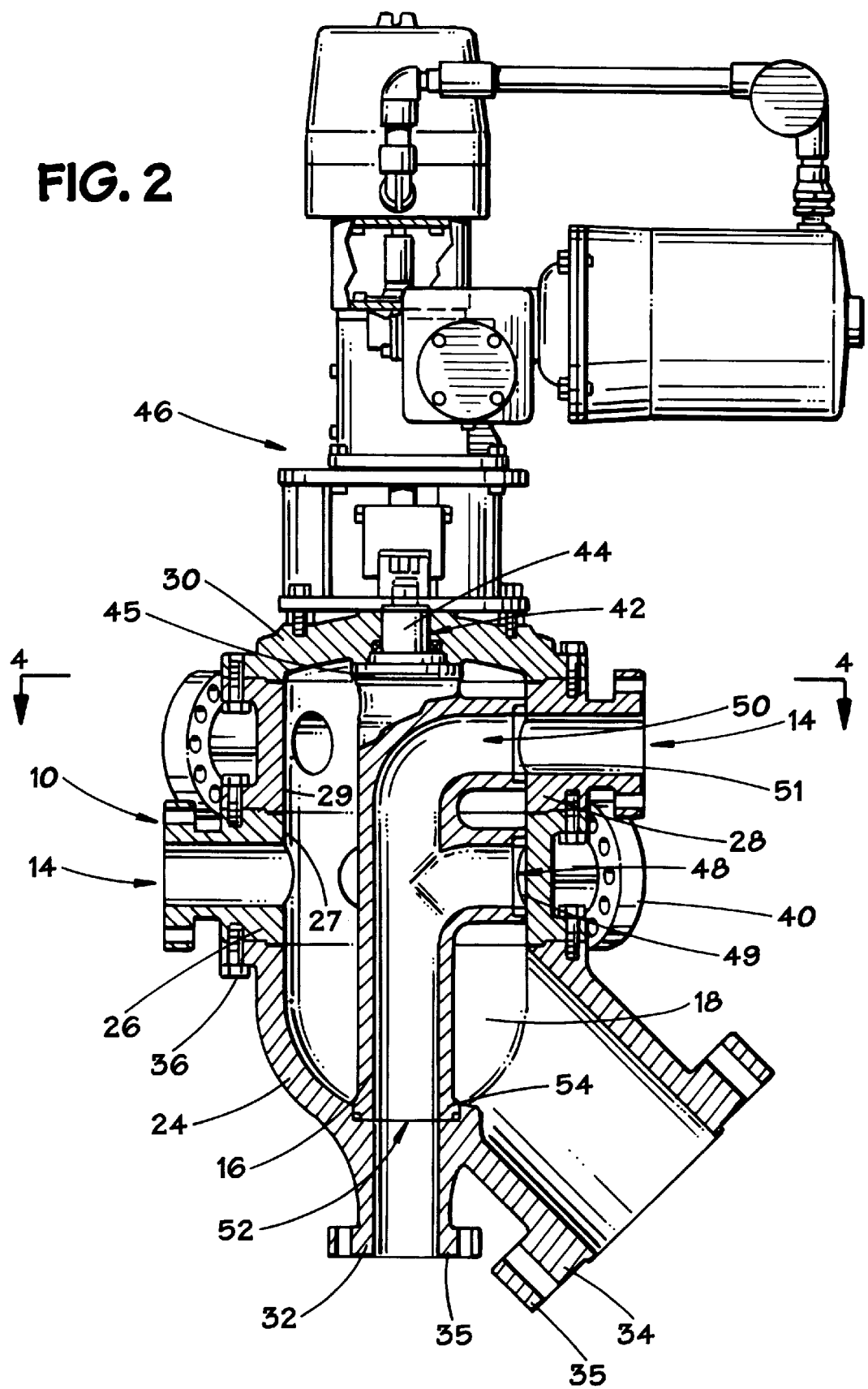
FIG. 2 is a cross-sectional view of a first embodiment of a modular rotary selector valve.

FIG. 2 shows a cross-sectional view of a first embodiment of the modular rotary selector valve 10 illustrated in FIG. 1. This embodiment of the modular rotary selector valve 10 comprises several modular components, including an outlet port module 24, a lower valve body module 26, an upper valve body module 28, and a valve body head 30. Each of these components is preferably formed of carbon steel, but could be formed of iron or other high-strength, and preferably castable, material. Between the outlet port module 24 and the valve body head 30 is rotatably mounted an inlet port selector rotor 16. The inlet port selector rotor 16 is also preferably formed of carbon steel, but could be formed of another high-strength, and preferably abrasion resistant and castable, material. These individual components are better illustrated in FIG. 3, which shows an exploded perspective view of the first embodiment.

Figure 3:
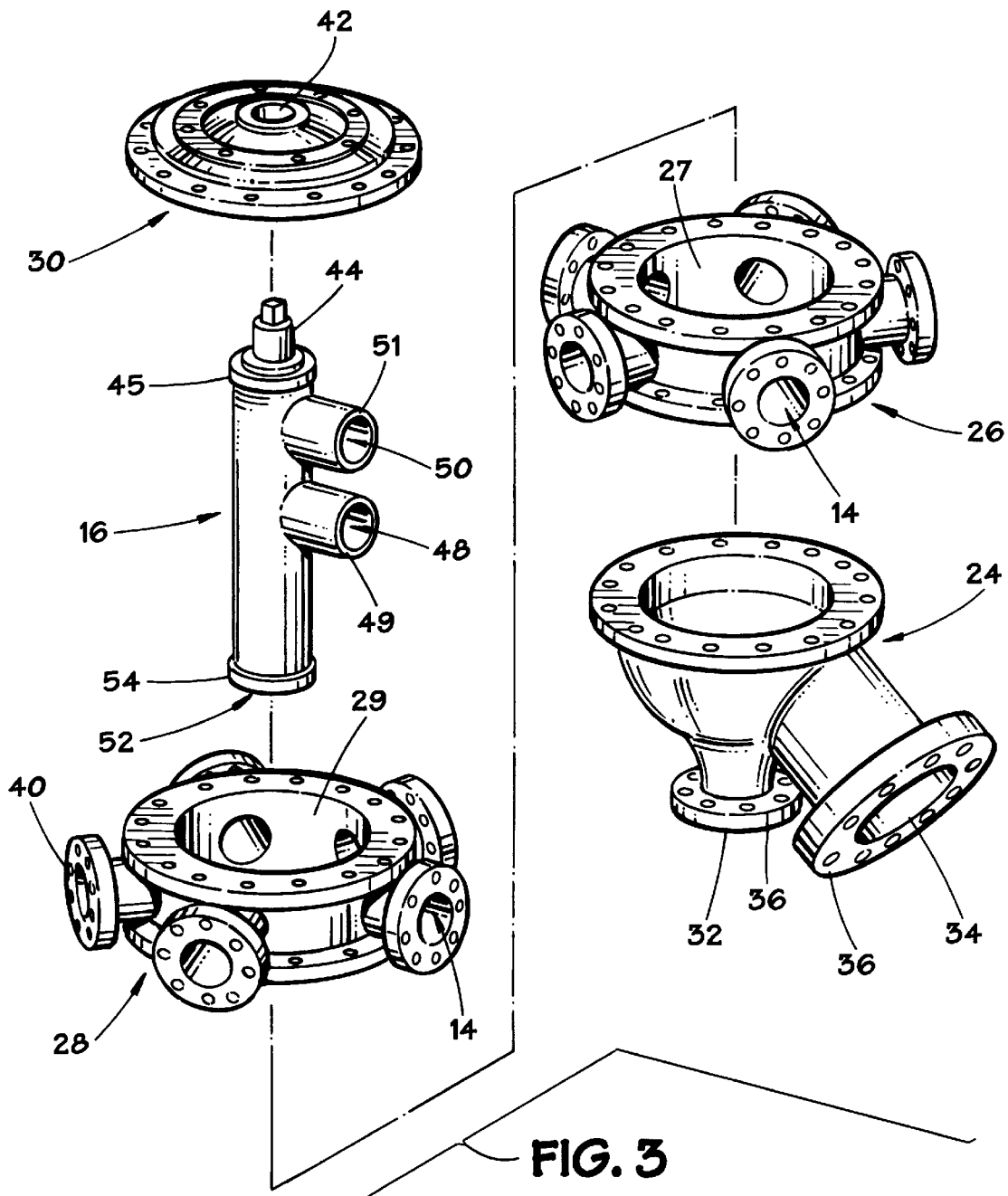
FIG. 3 is an exploded perspective view of the first embodiment illustrated in FIG. 2.

Referring again to FIG. 2, the outlet port module 24 has both a test port 32 and a production port 34. In the system illustrated in FIG. 1, the test port 32 is connected to the test line 20 and the production port 34 is connected to the combined production line 22 of that same system. Such connections may be made by ANSI flange type connections 35, as illustrated in FIGS. 2 and 3, or by other methods of connection known in the art, such as threaded connections or victolic clamp connections. Preferably, for optimal throughput, the test port 32 should be of the same or greater diameter than the diameter of the inlet ports 14, and the diameter of the production port 34 should be at least twice the diameter of the inlet ports 14.

In this embodiment, the lower valve body module 26 is detachably coupled to the outlet port module 24 using fastening means known to those in the art, such as high-strength bolts or studs 36. A sealing means, such as an O-ring (not shown), would typically be coupled between the lower valve body module 26 and the outlet port module 24 to seal within the interior portion of the valve body 18 the pressurized fluids and gases entering the valve through the inlet ports 14. Such a sealing means would typically be formed of either elastomeric or metallic material depending upon the pressure requirements of the particular application. Alternatively, the outlet port module 24 and the lower valve body module 26 could be formed in a single unit from a single piece of castable material. The upper valve body module 28 is detachably coupled to the lower valve body module 26 using fastening means 36 as described above. Additionally, a sealing means, such as described above, would typically be coupled between the lower valve body module 26 and the upper valve body module 28.

Both the lower valve body module 26 and the upper valve body module 28 include a plurality of inlet ports 14. The upper valve body module 28 is coupled to the lower valve body module 26 such that the plurality of radially spaced inlet ports 14 of the upper valve body module 28 are angularly interposed with the plurality of radially spaced inlet ports 14 of the lower valve body module 26. This angular interposition between the inlet ports 14 of the lower valve body module 26 and the upper valve body module 28 is better illustrated in FIG. 4, which shows a top view of the first embodiment of the modular rotary selector valve 10. In this first embodiment, where both the lower valve body module 26 and the upper valve body module 28 each have five radially spaced inlet ports 14, the inlet ports 14 of the upper valve body module 28 are preferably offset from the inlet ports 14 of the lower valve body module 26 by an angle of about 36°, measured from the center vertical axis of the inlet port selector rotor 16. FIG. 5 shows a exemplary schematic representation of the angular interposition between the inlet ports 14 of the upper valve body 28 and the inlet ports 14 of the lower valve body 26.

In this embodiment, each of the inlet ports 14 extend outwardly from the upper and lower valve body modules 28 and 26 and terminate in ANSI flange type connections 40. It will be recognized, however, that other types of connections, such as threaded or victolic clamp, could be used to couple the incoming production lines 12 to the inlet ports 14 of the upper and lower valve body modules 28 and 26. Additionally, although the upper and lower valve body modules 28 and 26 illustrated in FIG. 3 each include a total of five radially spaced inlet ports 14, a different number of inlet ports 14 could be implemented.

Also illustrated in FIGS. 2 and 3 is a valve body head 30 that is detachably coupled to the upper valve body module 28 using fastening means 36 as described above. A sealing means would typically be coupled between the upper valve body module 28 and the valve body head 30. The valve body head 30 serves to enclose the interior portion of the valve body 18. Alternatively, the valve body head 30 and the upper valve body module 28 could be formed in a single unit from a single piece of castable material.

In the center of the valve body head 30 is a circular opening 42 through which extends the drive shaft 44 of the inlet port selector rotor 16. The drive shaft 44 of the inlet port selector rotor 16 may be operatively coupled to an actuating means 46 (FIG. 2). Such actuating means can be detachably coupled to the valve body head 30, as shown in FIG. 2. The actuating means 46 may be any type of device that is operable to rotate the inlet port selector rotor 16 within the interior portion of the valve body 18. It will be recognized by one skilled in the art that a variety of such actuating means 46 can be used for this purpose. For example, the AC or DC powered micro-switch or LED optical encoder type actuators presently used with known rotary selector valves could function as the actuating means 46. It will be further recognized that the drive shaft 44 may also be turned manually, using an open-end or box-end wrench.

The inlet port selector rotor 16 of the first embodiment is a hollow, dual-elbow, cylindrical shaft rotatably mounted between the valve body head 30 and the outlet port module 24, as illustrated in FIG. 2. Typically, to facilitate rotational movement of the inlet port selector rotor 16, teflon bushings or tapered roller bearings (not shown) are coupled between the contact points of the upper end of the rotor 45 and the valve body head 30 and the lower end of the rotor 54 and the outlet port module 24. To prevent leakage, sealing means, such as O-rings, will also typically be coupled between the upper end of the rotor 45 and the valve body head 30 and between the lower end of the rotor 54 and the outlet port module 24. The inlet port selector rotor 16 includes a first inlet opening 48, a second inlet opening 50, and an outlet opening 52. The lower end of the inlet port selector rotor 54 is rotatably seated within the bottom portion of the outlet port module 24 such that the outlet opening 52 is operatively aligned with the test port 32 of the outlet port module 24. The first inlet opening 48 of the inlet port selector rotor 16 is rotatable in the same common plane as the plurality of radially spaced inlet ports 14 of the lower valve body module 26. The second inlet opening 50 is rotatable in the same common plane as the plurality of radially spaced inlet ports 14 of the upper valve body module 28.

The inlet port selector rotor 16 may be rotated by the drive shaft 44, either manually or via actuating means 46, so that either the first inlet opening 48 or the second inlet opening 50 is operatively aligned with an inlet port 14. Because of the angular interposition between the inlet ports 14 of the lower valve body module 26 and the inlet ports 14 of the upper valve body module 28, only one inlet opening 48 or 50 can be operatively aligned with an inlet port 14 at a given time. This is best illustrated in FIG. 5, which shows a schematic representation of the first inlet opening 48 being operatively aligned with an inlet port 14 of the lower valve body module 26 while the second inlet opening 50 is centered between two inlet ports 14 of the upper valve body module 28. In this configuration, the first inlet opening 48 is positioned to receive the production from an incoming production line 12 that may be coupled to the selected inlet port 14. The selected production fluids and gases are then diverted through the hollow portion of the inlet port selector rotor 16 and the test port 32 to the test line 20. At the same time, the face 51 (FIG. 3) of the second inlet opening 50 is positioned against the interior surface of the upper valve body module 29 such that no inlet port 14 in the upper valve body module 28 is operatively aligned with the second inlet opening 50, i.e., the second inlet opening 50 is in the "off" position.

The face of the first inlet opening 49 and the face of the second inlet opening 51 both terminate with a sealing means (preferably elastomeric) such that first inlet opening 48 is moveable in a sealed relationship with the interior surface of the lower valve body module 27 and the second inlet opening 50 is moveable in a sealed relationship with the interior surface of the upper valve body modules 29. Such sealing means functions to reduce wear and to prevent leakage between the face of the first inlet opening 49 and the interior surface of the lower valve body module 27 and between the face of the second inlet opening 51 and the interior surface of the upper valve body module 29. It will be recognized that sealing means operable for this purpose are known to those skilled in the art.

Thus, the modular rotary selector valve 10 is configured such that only one inlet port 14 should provide a production flow through the inlet port selector rotor 16 to the test port 32 at any given time. The fluids or gases that enter the interior portion of the valve body 18 through the non-selected inlet ports 14 of the valve body modules 26 and 28 are combined within the interior portion of the valve body 18 and exhausted through the production port 34 to the combined production line 22. In this manner, the fluids and gases from a single incoming production line 12 can be individually selected and diverted through the test port 32 to a test line 20 for sampling and testing without disturbing the production from each of the remaining non-selected incoming production lines 12.

Figure 5:
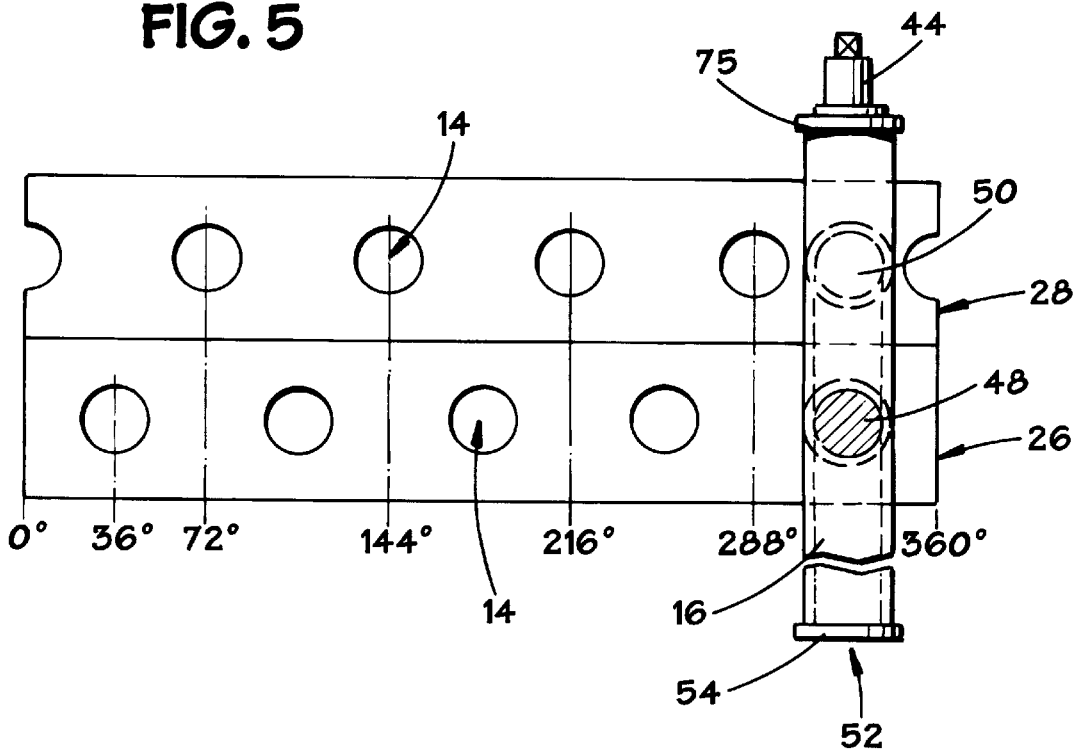
FIG. 5 is a schematic representation of the inlet port and rotor configuration of the first embodiment illustrated in FIG. 2.
Figure 6:
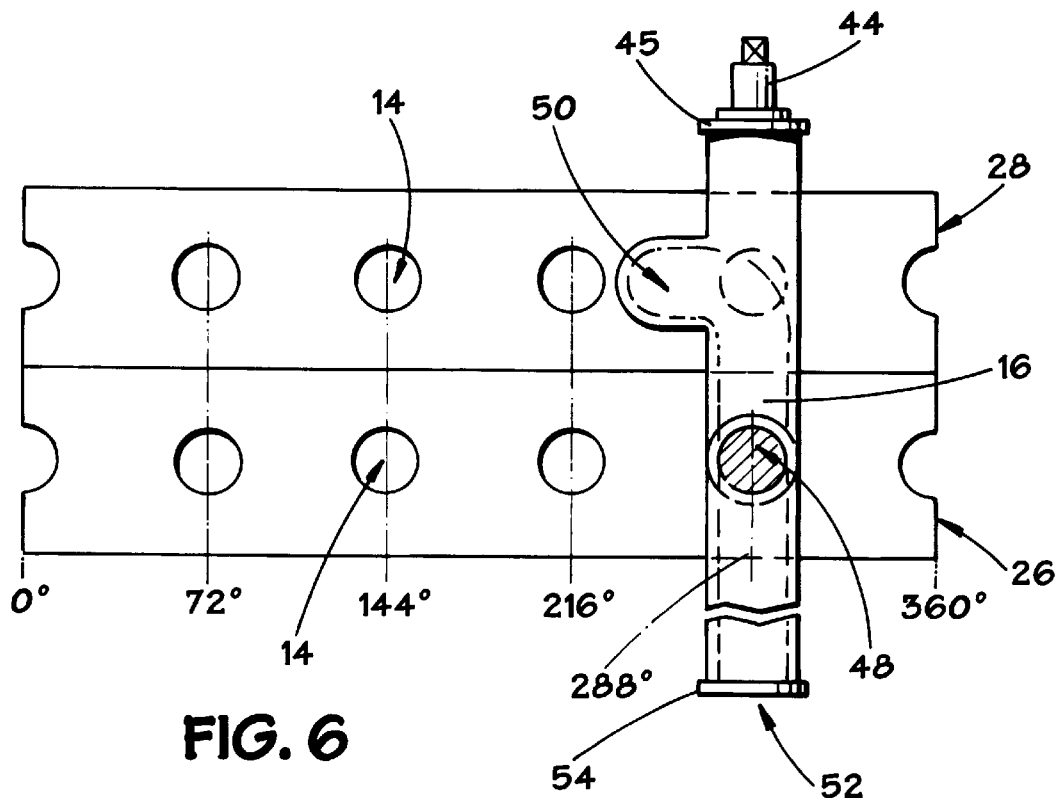
FIG. 6 is a schematic representation of the inlet port and rotor configuration of a second alternative embodiment of a modular rotary selector valve.

A schematic representation of a second alternative embodiment is illustrated in FIG. 6. In comparison to the first embodiment shown in FIGS. 2 and 5, wherein the inlet ports 14 of the lower valve body module 26 and the upper valve body module 28 are angularly interposed, the second alternative embodiment illustrated in FIG. 6 comprises a modular rotary selector valve 10 in which the inlet ports 14 of the upper valve body module 28 are vertically aligned with the inlet ports 14 of the lower valve body module 26. Because the inlet ports 14 of the upper valve body module 28 and lower valve body module 26 are vertically aligned, the inlet openings 48, 50 of the inlet port selector rotor 16 are reconfigured so that only one of either the first inlet opening 48 or the second inlet opening 50 can be operatively aligned with an inlet port 14 at any given time. One such possible reconfiguration of the inlet port selector rotor 16 is illustrated in FIG. 6, wherein the second inlet opening 50 is formed on the inlet port selector rotor 16 such that when the first inlet opening 48 is centered on an inlet port 14 in the lower valve body module 26, the second inlet opening 50 is centered between two inlet ports 14 in the upper valve body module 28. Conversely, when the second inlet opening 50 is centered on an inlet port 14 in the upper valve body module 28, the first inlet opening 48 would be centered between two inlet ports 14 in the lower valve body module 26. The remaining elements of this second alternative embodiment would remain the same as those described with reference to the first embodiment illustrated in FIGS. 2 and 3. Furthermore, such second alternative embodiment would operate in the same fashion as the first embodiment to isolate the production from a single incoming production line 12 and to divert the selected production to a test line 20.

Figure 7:
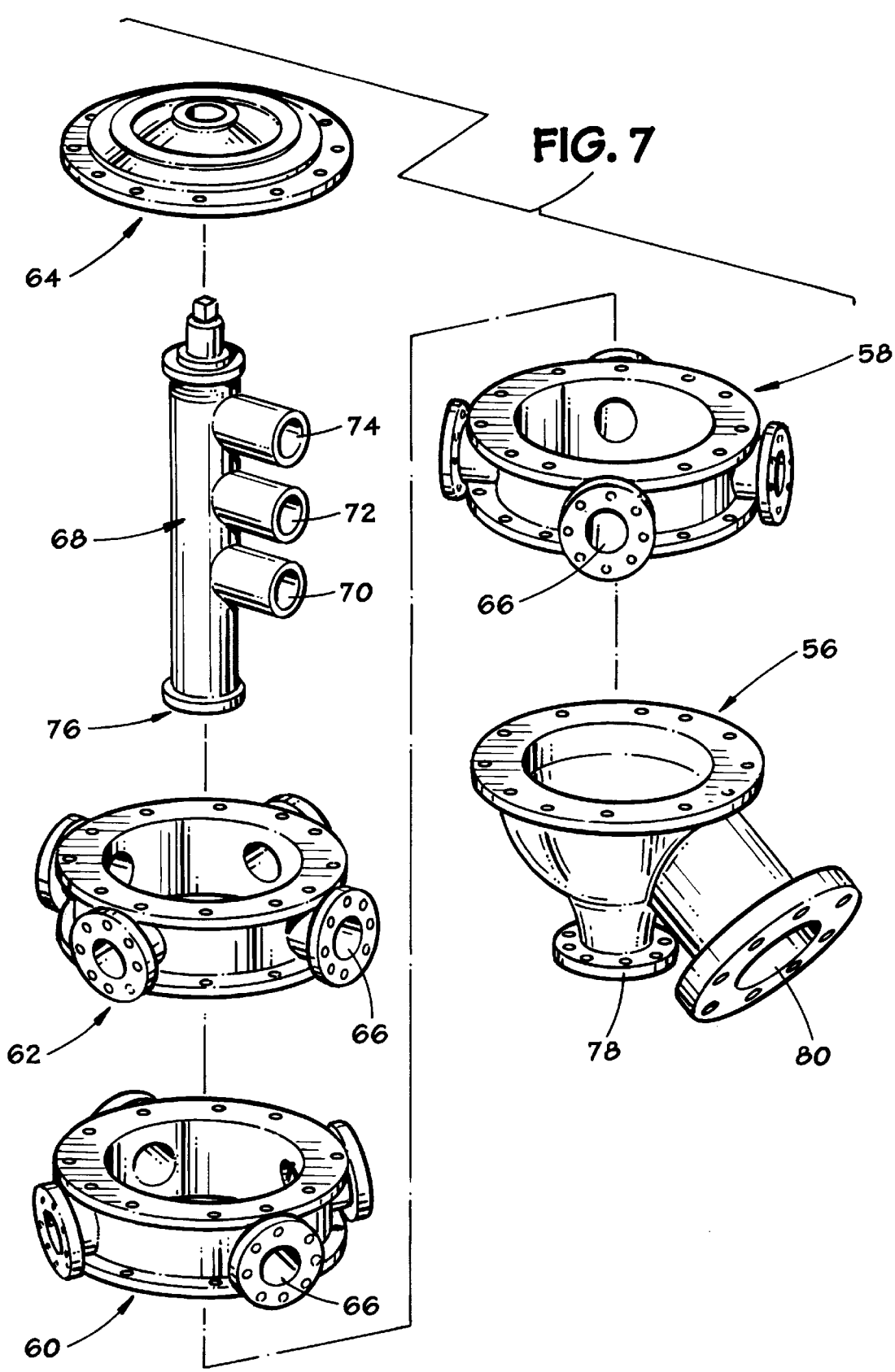
FIG. 7 is an exploded perspective view of a third alternative embodiment of a modular rotary selector valve.

Referring now to FIG. 7, which shows an exploded perspective view of a third alternative embodiment of a modular rotary selector valve 10 having three modular valve body sections. This third alternative embodiment includes an output port module 56, a first valve body module 58, a second valve body module 60, a third valve body module 62, and a valve body head 64. An inlet port selector rotor 68 is rotatably mounted between the output port module 56 and the valve body head 64. The embodiment illustrated in FIG. 7 is assembled in similar fashion to the first embodiment illustrated in FIGS. 2 and 3, with the exception that an additional valve body module is coupled between the output port module 56 and the valve body head 64. The first valve body module 58 is detachably coupled to the output port module 56. The second valve body module 60 is detachably coupled to the first valve body module 58. The third valve body module 62 is detachably coupled to the second valve body module 60. The valve body head 64 is detachably coupled to the third valve body module 62. Each of the modular components (56, 58, 60, 62, and 64) would be detachably coupled using fastening means as described above with reference to the first embodiment illustrated in FIGS. 2 and 3. In addition, sealing means would typically be coupled between each of the detachably coupled components.

Figure 4:
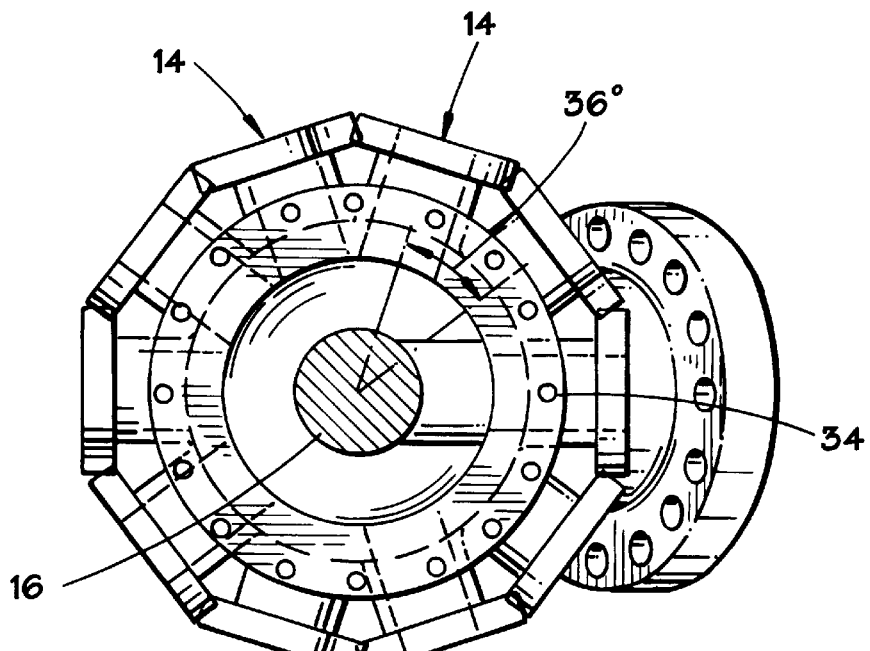
FIG. 4 is a top view of the first embodiment illustrated in FIG. 2.
Figure 8:
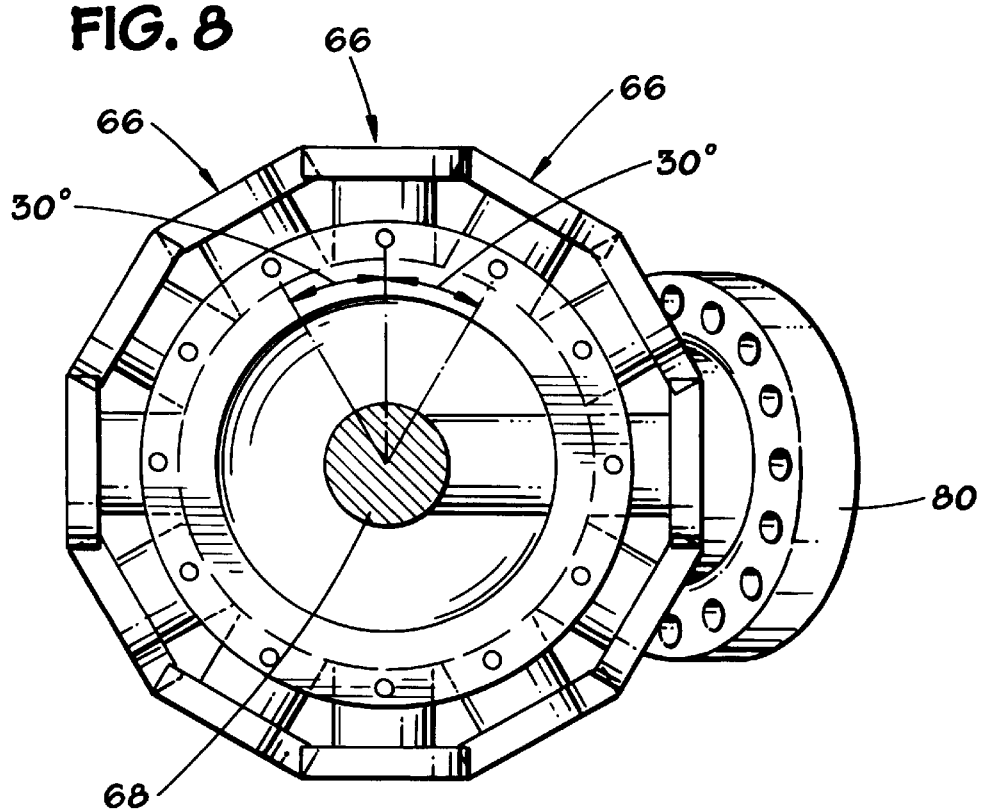
FIG. 8 is a top view of the third alternative embodiment illustrated in FIG. 7.

It should be noted that each of the valve body modules 58, 60, 62 of this third alternative embodiment have only four radially spaced inlet ports 66, as opposed to the five radially spaced inlet ports 14 of the first embodiment illustrated in FIGS. 2, 3, and 4. In addition, the inner-diameter of each of the valve body modules 58, 60, 62 is greater than the inner-diameter of the valve body modules 26 and 28 of the first embodiment shown in FIGS. 2, 3, and 4. This is more clearly illustrated in FIG. 8, which shows a top view of this third alternative embodiment. The reason for the fewer number of inlet ports 66 and the increased inner-diameter of the valve body modules 58, 60, 62 is to allow for angular interposition of the inlet ports 66 on each of the valve body modules 58, 60, 62 given the greater number of valve body modules 58, 60, 62. FIG. 8 shows the angular interposition between the inlet ports 66 of each of the valve body modules 58, 60, 62. In this configuration, the inlet ports 66 of the second valve body module 60 are offset from the inlet ports 66 of the first valve body module 58 by about 30°, measured from the center vertical axis of the inlet port selector rotor 68. The inlet ports 66 of the third valve body module 62 are offset from the inlet ports 66 of the second valve body module 60 by about 30° and are offset from the inlet ports 66 of the first valve body module 58 by about 60°. This angular interposition is better illustrated in FIG. 9, which shows a schematic representation of the third alternative embodiment.

The inlet port selector rotor 68 operates in the same fashion as the inlet port selector rotor 16 of the first embodiment, with the exception that there is an additional inlet opening on the inlet port selector rotor 68. The inlet port selector rotor 68 of the third alternative embodiment is a hollow, three-elbow, cylindrical shaft having a first inlet opening 70, a second inlet opening 72, a third inlet opening 74, and an outlet opening 76. As with the inlet port selector rotor 68 of the first embodiment, illustrated in FIGS. 2 and 3, the inlet port selector rotor 68 may be operated either manually or by an actuating means 46 to select a single inlet port 66. The first inlet opening 70 is rotatable in the same common plane as the plurality of inlet ports 66 of the first valve body module 58. The second inlet opening 72 is rotatable in the same common plane as the plurality of inlet ports 66 of the second valve body module 60. The third inlet opening 74 is rotatable in the same common plane as the inlet ports 66 of the third valve body module 62.

As with the inlet port selector rotor 16 described with reference to the first embodiment in FIGS. 2 and 3, the inlet port selector rotor 68 of the third alternative embodiment is rotatable so that only one of the inlet openings 70, 72, 74 will be operatively aligned with an inlet port 66 at any given time. When, for example, the first inlet opening 70 is operatively aligned with an inlet port 66, both the second inlet opening 72 and the third inlet opening 74 are situated between inlet ports 66 on the interior surface of the second valve body module 60 and the third valve body module 62, respectively. This is illustrated in FIG. 9, which shows a schematic representation of the third alternative embodiment. In this manner, production will flow only through the first inlet opening 70, as the second inlet opening 72 and the third inlet opening 74 are not operatively aligned with an inlet port 66, i.e., are in "off" positions. Thus, the production from a single incoming production line 12 can be diverted through the hollow portion of the inlet port selector rotor 68 and the test port 78 (FIG. 7) to the test line 20, while the production from the remaining incoming production lines 12 is combined within the interior portion of the rotary selector valve 18 and exhausted through the production port 80 (FIG. 7) to the combined production line 22.

Although the specific embodiments discussed above are directed at modular rotary selector valves having two and three valve body modules, the present invention is not meant to be so limited. The modular rotary selector valve could further comprise additional valve body modules, with additional corresponding inlet openings in the inlet port selector rotor, to provide a greater number of inlet ports on the valve. Furthermore, the present invention is not meant to be limited solely to oil and gas applications, as its advantages may be recognized in any application wherein there are a plurality of source lines carrying liquids, gases, or other matter that need to be individually diverted to a selected destination.

What is claimed is:

1. A rotary selector valve comprising:

an outlet port module having a first outlet port and a second outlet port;

a lower valve body module having a plurality of radially spaced inlet ports, said lower valve body module being coupled to said outlet port module;

an upper valve body module having a plurality of radially spaced inlet ports, said upper valve body module being coupled to said lower valve body module;

a valve body head being coupled to said upper valve body module; and an inlet port selector rotor having a first inlet opening, a second inlet opening, and an outlet opening, said inlet port selector rotor being rotatably mounted between said outlet port module and said valve body head, said first inlet opening being disposed adjacent the plurality of radially spaced inlet ports of said lower valve body module and said second inlet opening being disposed adjacent the plurality of radially spaced inlet ports of said upper valve body module, said outlet opening being operatively coupled in communication with the first outlet port of said outlet port module.

2. The rotary selector valve of claim 1 wherein the plurality of radially spaced inlet ports of said upper valve body module are angularly interposed with the plurality of radially spaced inlet ports of said lower valve body module.

3. The rotary selector valve of claim 1 wherein said outlet port module and said lower valve body module are formed in a single unit.

4. The rotary selector valve of claim 1 wherein said upper valve body module and said valve body head are formed in a single unit.

5. The rotary selector valve of claim 1 wherein:

said outlet port module and said lower valve body module are formed in a single unit; and said upper valve body module and said valve body head are formed in a single unit.

6. The rotary selector valve of claim 1, further comprising an actuator mechanism being operatively coupled to said inlet port selector rotor for controlling the rotary movement of said inlet port selector rotor.

* * * * *